Aug. 9, 1932.                 W. G. WHITMAN                 1,871,207
                       FILTERING PROCESS AND APPARATUS
                            Filed Oct. 20, 1930
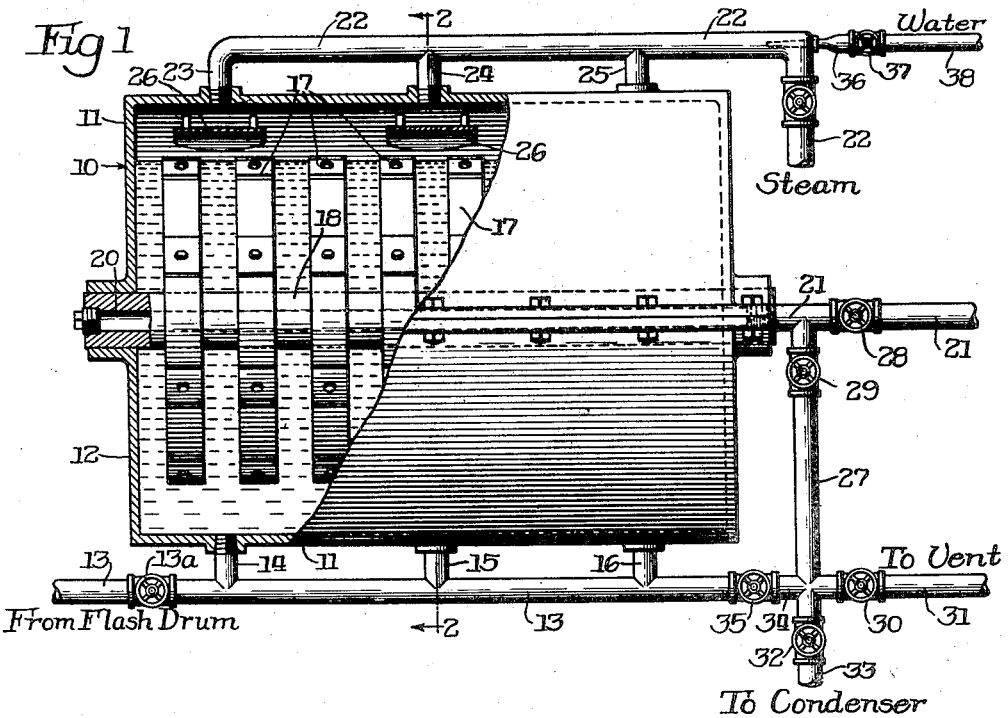
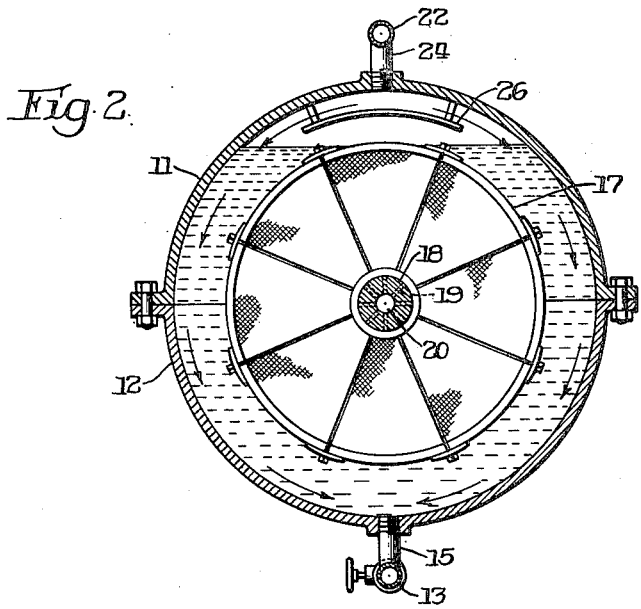
Inventor:
Walter G. Whitman.
By Bruce K. Brown atty Patented Aug. 9, 1932

1,871,207

UNITED STATES PATENT OFFICE

WALTER G. WHITMAN, OF WHITING, INDIANA, ASSIGNOR TO STANDARD OIL COMPANY (INDIANA), OF CHICAGO, ILLINOIS, A CORPORATION OF INDIANA

FILTERING PROCESS AND APPARATUS

Application filed October 20, 1930. Serial No. 489,843.

This invention relates to a process and apparatus for filtering difficultly separable solids and liquids, and it pertains more particularly to the removal of carbon, lime, calcium and iron sulfides, or other solids and impurities from petroleum oils, such as pressure tar.

The object is to increase the efficiency of filtering equipment and to cut down the amount of drying and/or cooling fluid required for obtaining a good filter cake. A further object is to decrease the time required for drying and cooling the filter cake and the filter press so that the apparatus will be capable of filtering increased volumes of tar at a minimum cost.

A further object of my invention is to provide a means for quickly removing liquid from a filter cake prior to discharging the filter cake from the press. This is difficult because of the tendency of the filter cake to crack, break or become disrupted; if rupture of the cake occurs, the steam or other drying fluid will flow through the cracks and will be ineffective in removing liquid from the filter cake. By my invention I provide a means for introducing a drying fluid in such a manner that it will not disturb the filter cake.

A further object is to obtain more effective filtration and to obtain a filter cake which may be readily stripped from the leaves of the filter. Other objects will be apparent from the following detailed description.

In practicing my invention I first build up a cake on my filter leaves to a desired thickness, usually about one inch, and then force all of the unfiltered material out of the filter chamber by means of steam. In order that the steam may not disrupt the cake on the various plates I prefer to admit it tangentially around the sides of the filter chamber. This I accomplish by the use of baffles or tangentially disposed nozzles. Since my invention pertains particularly to the filtration of pressure tar it is necessary to cool the filter cake from about 600° F. to about 300° F. before discharging, a step which has heretofore been accomplished by the admission of steam. I have discovered that if liquid water is atomized into said steam this cooling may be effected in a much shorter period of time, the filter cake is not impaired thereby and a marked improvement of efficiency results.

In the accompanying drawing wherein I have illustrated a preferred embodiment of my invention and wherein like parts are designated by similar reference characters in the several views, Figure 1 is an elevation, partly in section, of my improved apparatus, and Figure 2 is a vertical section taken along the line 2—2 of Figure 1.

The invention will be described as applied to the filtration of flashed pressure tar. Pressure tar is a petroleum product resulting from a cracking process wherein gas oil or other charging stock is heated to temperatures of about 900° F. at a pressure of about 300 pounds and maintained under these conditions in reaction chambers or soaking drums until a considerable conversion takes place. Frequently the charging stock used for this process contains some corrosive compounds such as sulfur compounds which must be removed or neutralized to prevent excessive corrosion in the apparatus. To combat this it is frequently the practice to add lime or some other neutralizing agent to the charging stock. Material withdrawn from the base of these reaction chambers is called "pressure tar" and it contains quantities of coke, lime (if added to the charging stock) and/or other solids or impurities. This tar may be introduced into an enlarged chamber at substantially atmospheric pressure wherein the sensible heat of the tar causes the vaporization of the light constituents. The remaining oil which we will designate as "flashed pressure tar" is usually used as fuel or as a road oil, and in either case it is essential that solids, such as coke, lime, etc. be removed.

I may use any conventional type of pressure filter, preferably of the leaf type as illustrated in the drawing. The cylindrical casing 10 comprises an upper portion 11 bolted or otherwise secured to a relatively movable lower portion 12, or the end of the casing may be removable so that the filter leaves may be withdrawn for the removal of the filter cake. The flashed pressure tar is admitted to the filter chamber through pipe 13 and inlets 14, 15 and 16. Inside of the chamber there are a plurality of filter leaves 17. These leaves communicate with a common shaft or pipe 18 by means of suitable channels 19 so that the filtrate may be removed from the center 20 of the shaft or pipe and thence conducted through pipe 21 to a suitable receiver. The particular structural mounting of my filter forms no part of the present invention and will therefore not be described in detail.

I have found it advantageous to precoat the filter leaves with filter-cel or infusorial earth prior to the admission of flashed pressure tar. A slurry of filter aid in oil or pressure tar may be introduced through a suitable pipe (not shown) and this precoating may require fifteen or twenty minutes, after which the pressure tar may be filtered for a period of about two hours. The length of time will naturally depend upon the temperature and nature of the tar, the amount of solids contained therein and on the nature of the filter leaves. By using finely woven wire filter leaves protected by the precoat hereinabove described, I find that when filtering Mid-Continent pressure tar, a cake may be built to a thickness of about one inch in two hours, the temperature being maintained at about 500° to 600° F.

When the cake has reached the desired thickness, steam is admitted through valved pipe 22 and steam inlets 23, 24 and 25. In order that the steam shall not impinge directly upon the filter cake I provide curved baffle plates 26 which I mount between the steam inlets and the filter leaves. These baffles are designed to direct the steam around the periphery of the filter chamber and to keep the steam from blasting the filter cake off the leaves. It is understood that while I have shown a curved baffle for this purpose, I may use tangentially disposed nozzles or other equivalent means for introducing the steam.

I provide a T-connection in pipe 21 so that the contents of this pipe may be directed through pipe 27 when valve 28 is closed and valve 29 is opened (normally valve 29 is closed and valve 28 is open). Pipe 27 leads through valve 30 to a vent pipe 31 and it also leads through valve 32 to a pipe 33 which is connected to a suitable steam condenser (not shown). Pipe 13 is connected to pipe 27 by pipe 34 in which there is a suitable valve 35. A valve 13A is provided in pipe 13 in front of the first inlet 14.

When the steam is first admitted into the chamber valves 28, 29 and 35 are closed so that the unfiltered pressure tar is forced out of the filter chamber and back of valve 13A which is then closed. As soon as valve 13A is closed, valve 29 is opened so that the steam will pass through the filter cake and the filter leaves, and will be discharged through pipe 27 and vent pipe 31 or condenser pipe 33. As the steam passes through the filter cake it removes the liquid oil therefrom and at the same time it cools the filter. This has heretofore required a considerable length of time, two hours being sometimes required for obtaining a filter cake of the desired properties.

I have discovered that this step may be markedly accelerated by the introduction of liquid water with the steam in the above described drying operation. The water may be introduced into the steam conduit 22 by means of atomizer 36, the amount of water being regulated by valve 37 in water main 38. If desired, I may provide means for introducing the water in each individual steam inlet 23, 24 and 25, and I may use suitable orifices instead of a valve for regulating the admission of water.

Baffles 26 prevent any particles of water from impinging directly upon the filter cake. The finely dispersed water particles are therefore carried by the steam around the sides of the chamber and are immediately converted into steam. The formation of steam in situ is very effective in cooling the press and driving the flashed pressure tar out of the filter cake.

It is essential that the water be free from salts or chemicals that might react with, deposit on, or otherwise affect the woven wire filter.

The amount of water introduced will, of course, vary under different conditions but I have obtained excellent results by mixing 25 to 10% of liquid water with 75 to 90% steam. If water is used alone it will set up undue stresses in the filter and the shock may even cause a physical rupture of the parts thereof. If water is directed onto the filter cake, it vaporizes with such explosive violence that parts of the cake are dislodged so that it cannot be satisfactorily dried. By mixing liquid water with the steam I avoid undue stresses in the apparatus and I avoid the direct impingement of liquid water onto the filter cake. At the same time I obtain a high cooling rate due to the vaporization of the water. The system may then be cleaned out by opening valve 35 and sweeping with steam.

An important feature of my invention is the time saving which I obtain by the rapid cooling of the filter cake. When filtering tar of 3° A. P. I. gravity I have reduced the time of steaming to less than one-fourth the time heretofore required.

While I have described a preferred embodiment of my invention it is to be understood that I do not limit myself to the particular details hereinabove set forth except as defined by the following claims.

I claim:

1. The method of cooling a hot, oily filter cake which comprises incorporating liquid water into steam and contacting said filter cake with said mixture of steam and liquid water.

2. The method of separating pressure tar from solids which comprises filtering a mixture of said tar and solids to build up a filter cake, and contacting said filter cake with a mixture of steam and liquid water whereby said water is converted in situ into steam to effect a rapid cooling without impairing said cake.

3. The method of claim 2 wherein the filtration is effected at a temperature of about 300° to 600° F.

4. The method of cooling a hot filter press, and of cooling a hot oily filter cake and expelling oil therefrom which comprises incorporating liquid water into steam, introducing said mixture into said press whereby said water is converted into steam, and passing at least a part of said steam through said cake.

5. The method of cooling a filter cake formed by the filtration of hot pressure tar which comprises contacting said filter cake with a mixture containing about 25 to 10% water and 75 to 90% steam and vaporizing said water in the filter.

Signed this 3rd day of October, 1930, at Whiting, in the county of Lake, State of Indiana.

WALTER G. WHITMAN.